US009419346B2

(12) United States Patent
Yoon

(10) Patent No.: US 9,419,346 B2
(45) Date of Patent: Aug. 16, 2016

(54) HIGH ISOLATION ANTENNA STRUCTURE ON A GROUND PLANE

(71) Applicant: BROADCOM CORPORATION, Irvine, CA (US)

(72) Inventor: Seunghwan Yoon, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/568,865

(22) Filed: Dec. 12, 2014

(65) Prior Publication Data

US 2015/0200466 A1 Jul. 16, 2015

Related U.S. Application Data

(60) Provisional application No. 61/927,611, filed on Jan. 15, 2014, provisional application No. 62/087,069, filed on Dec. 3, 2014.

(51) Int. Cl.
| | |
|---|---|
| *H01Q 9/26* | (2006.01) |
| *H01Q 21/28* | (2006.01) |
| *H01Q 9/28* | (2006.01) |
| *H01Q 1/48* | (2006.01) |
| *H01Q 1/24* | (2006.01) |
| *H04B 1/40* | (2015.01) |
| *H01Q 9/42* | (2006.01) |

(52) U.S. Cl.
CPC ............ *H01Q 21/28* (2013.01); *H01Q 1/24* (2013.01); *H01Q 1/48* (2013.01); *H01Q 9/26* (2013.01); *H01Q 9/28* (2013.01); *H01Q 9/42* (2013.01); *H04B 1/40* (2013.01); *H01Q 1/243* (2013.01)

(58) Field of Classification Search
CPC ........... H01Q 1/243; H01Q 9/26; H01Q 9/28; H01Q 9/42
See application file for complete search history.

(56) References Cited

U.S. PATENT DOCUMENTS

| | | | |
|---|---|---|---|
| 2005/0093677 A1* | 5/2005 | Forster et al. | 340/10.1 |
| 2006/0071864 A1 | 4/2006 | Richard et al. | |
| 2007/0200773 A1 | 8/2007 | Dou et al. | |
| 2011/0248895 A1* | 10/2011 | Bungo et al. | 343/702 |
| 2012/0262351 A1 | 10/2012 | Hamabe | |
| 2013/0307742 A1 | 11/2013 | Hu et al. | |

FOREIGN PATENT DOCUMENTS

WO 2012101633 A1 8/2012

OTHER PUBLICATIONS

European Patent Office; European Search Report; EP Application No. 14004397.7; Jun. 10, 2015; pp. 1-3.

* cited by examiner

*Primary Examiner* — David Bilodeau
(74) *Attorney, Agent, or Firm* — Garlick & Markison; Bruce E. Stuckman

(57) ABSTRACT

In accordance with one example, an antenna structure includes a three-dimensional dipole antenna having a first arm and a second arm that are suspended above a ground plane. One or more three-dimensional monopole antennas have corresponding monopole elements positioned in a plane of symmetry between the arms of the dipole. Other examples are disclosed.

20 Claims, 9 Drawing Sheets

HIGH ISOLATION ANTENNA STRUCTURE ON A GROUND PLANE

CROSS REFERENCE TO RELATED PATENTS

The present U.S. Utility Patent Application claims priority pursuant to 35 U.S.C. §119(e) to U.S. Provisional Application No. 61/927,611, entitled "HIGH ISOLATION ANTENNA STRUCTURE ON A GROUND PLANE," filed Jan. 15, 2014; and U.S. Provisional Application No. 62/087,069, entitled "HIGH ISOLATION ANTENNA STRUCTURE ON A GROUND PLANE," filed Dec. 3, 2014, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

1. Technical Field

This disclosure relates generally to wireless communications and more particularly to devices and components thereof that wirelessly communicate.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems to radio frequency radar systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, global system for mobile communications (GSM), code division multiple access (CDMA), WCDMA, local multi-point distribution systems (LMDS), multi-channel-multi-point distribution systems (MMDS), LTE, WiMAX, and/or variations thereof. As another example, infrared (IR) communication systems may operate in accordance with one or more standards including, but not limited to, IrDA (Infrared Data Association).

For an RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). The receiver is coupled to the antenna and includes a low noise amplifier, one or more intermediate frequency stages, a filtering stage, and a data recovery stage. The transmitter includes a data modulation stage, one or more intermediate frequency stages, and a power amplifier, which is coupled to the antenna.

Since a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, an antenna array having the same polarization, an antenna array having different polarization, and/or any number of other electromagnetic properties.

Two-dimensional antennas are known to include a meandering pattern or a micro strip configuration. For efficient antenna operation, the length of an antenna should be ¼ wavelength for a monopole antenna and ½ wavelength for a dipole antenna, where the wavelength ($\lambda$)=c/f, where c is the speed of light and f is frequency. For example, a ¼ wavelength antenna at 900 MHz has a total length of approximately 8.3 centimeters (i.e., $0.25*(3\times10^8 \text{ m/s})/(900\times10^6 \text{ c/s})=0.25*33$ cm, where m/s is meters per second and c/s is cycles per second). As another example, a ¼ wavelength antenna at 2400 MHz has a total length of approximately 3.1 cm (i.e., $0.25*(3\times10^8 \text{ m/s})/(2.4\times10^9 \text{ c/s})=0.25*12.5$ cm).

While two-dimensional antennas provide reasonable antenna performance for many wireless communication devices, their uses may be limited in one or more types of applications.

BRIEF DESCRIPTION OF THE SEVERAL VIEWS OF THE DRAWING(S)

DETAILED DESCRIPTION

Figure 1:
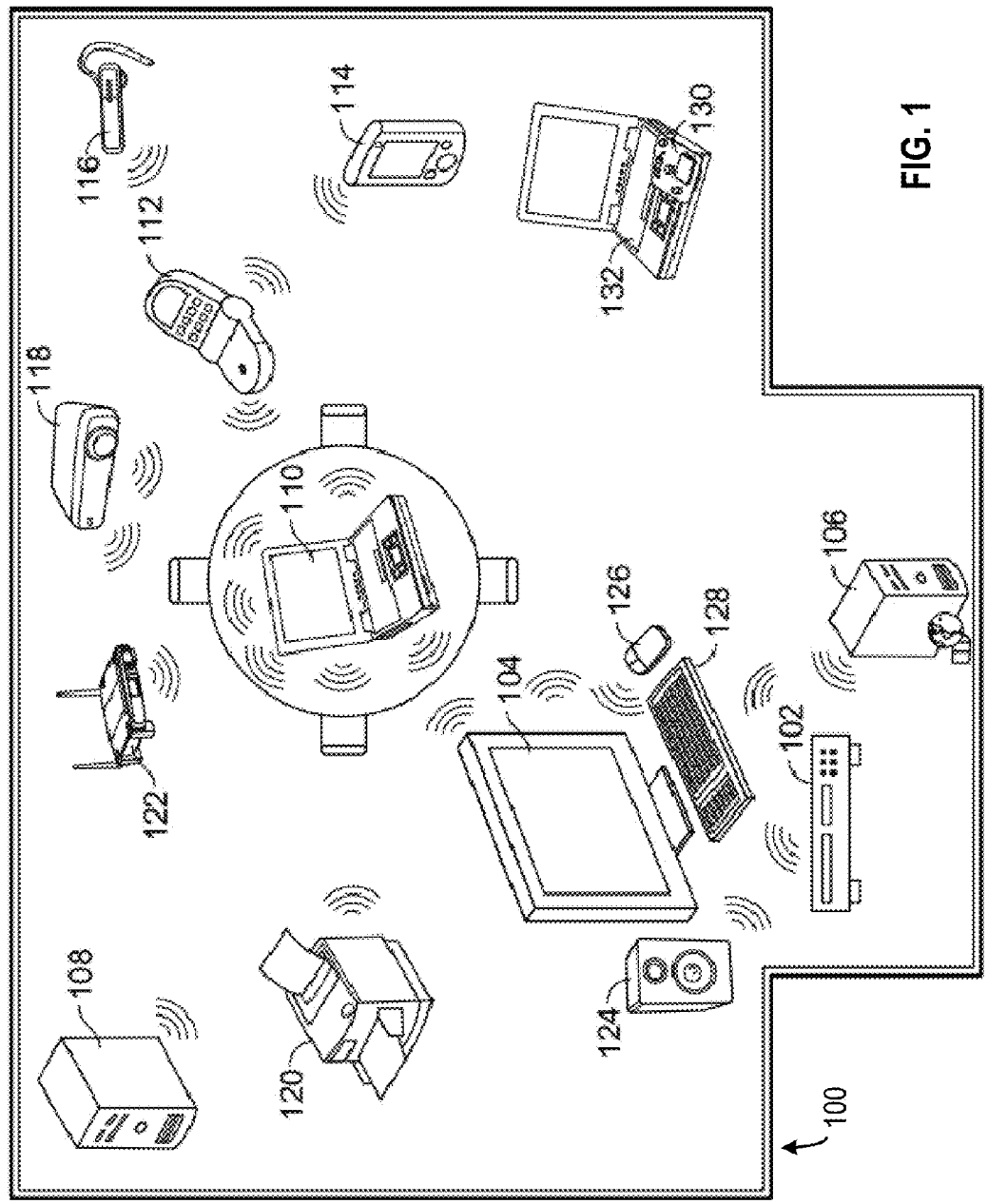
FIG. 1 is a schematic block diagram of an embodiment of a wireless communication environment in accordance with the present disclosure.

FIG. 1 presents a pictorial diagram of an example of a communication environment in accordance with the present disclosure. In general, devices are shown that each include an antenna that functions with a transmitter (TX) and a receiver (RX) (e.g., transceiver), to provide a communication link between the endpoints. Endpoints may be found in various contexts, including the home, business, public spaces and automobile. In this example, the environment 100 is a room. The environment 100 includes multiple endpoints that may communicate wirelessly with some or all the other endpoints. In FIG. 1, a media player 102 (e.g., a Blu-Ray player or streaming media player) streams high definition video and audio content to a television (TV) 104. Similarly, a home media server 106 with a wireless network interface streams audio (e.g., MP3 content) and video (e.g., MP4, AVI, or MPEG content) to the TV 104 and to other endpoints in the environment 100.

Other examples of endpoints in the environment 100 include an application and file server 108 that is in communication with the laptop computer 110. Additional or alternative computing devices may be present in the environment 100 such as desktop and tablet computers, which may also act as endpoints. The laptop computer 110 wirelessly communicates with peripheral devices, such as a projector 118 and a printer 120. The media player 102 is also shown wirelessly communicating with the projector 118. The laptop computer 110 may also wirelessly exchange information with other endpoints such as a gateway or network router 122.

In FIG. 1, a cell phone, personal digital assistant, tablet, phablet, portable email device or smartphone 112 and a portable gaming system 114 wirelessly exchange information (e.g., emails, text messages or video game saved game files). The smartphone 112 may also wirelessly connect to a radio receiver or other audio device such as earpiece 116. Other endpoints may exist in the environment 100, and different environments may include additional, fewer, or different endpoints. For example, the environment 100 may include stereo equipment, amplifiers, pre-amplifiers and tuners that wirelessly connect to each other and other endpoints in the room. Speaker 124 is shown wirelessly receiving audio signals from TV 104 to output sound from the TV.

Other examples of endpoints include musical instruments, microphones, climate control systems, intrusion alarms, audio/video surveillance or security equipment, network attached storage, pet tracking collars, or other devices. As additional examples, endpoints may further include automobiles, audio head ends or DVD players, satellite music transceivers, noise cancellation systems, voice recognition systems, navigation systems, alarm systems, engine computer systems, or other devices.

Computer components themselves may be wirelessly connected endpoints such that memory, mass storage devices (e.g., disk drive, tape drive), input devices (e.g. keyboard 128, mouse 126), output devices (e.g., display screen, printer 120) and central processing units may be the endpoints. Mouse 126 and keyboard 128 are shown wirelessly connecting with a display screen or TV 104. Endpoints may also include components or modules that make up the computing devices, such as circuitry, electronics, semiconductors, processing units, microelectronic circuits, etc. (e.g., computer components 130 shown in the cutaway view of a laptop 132).

While the forgoing has focused on a home environment, features of the present disclose disclosure can be applied in other environments such as an automotive network or other automotive environment, an office environment, an urban or other public space, a 5G wireless network environment or other wireless network.

Figure 2:
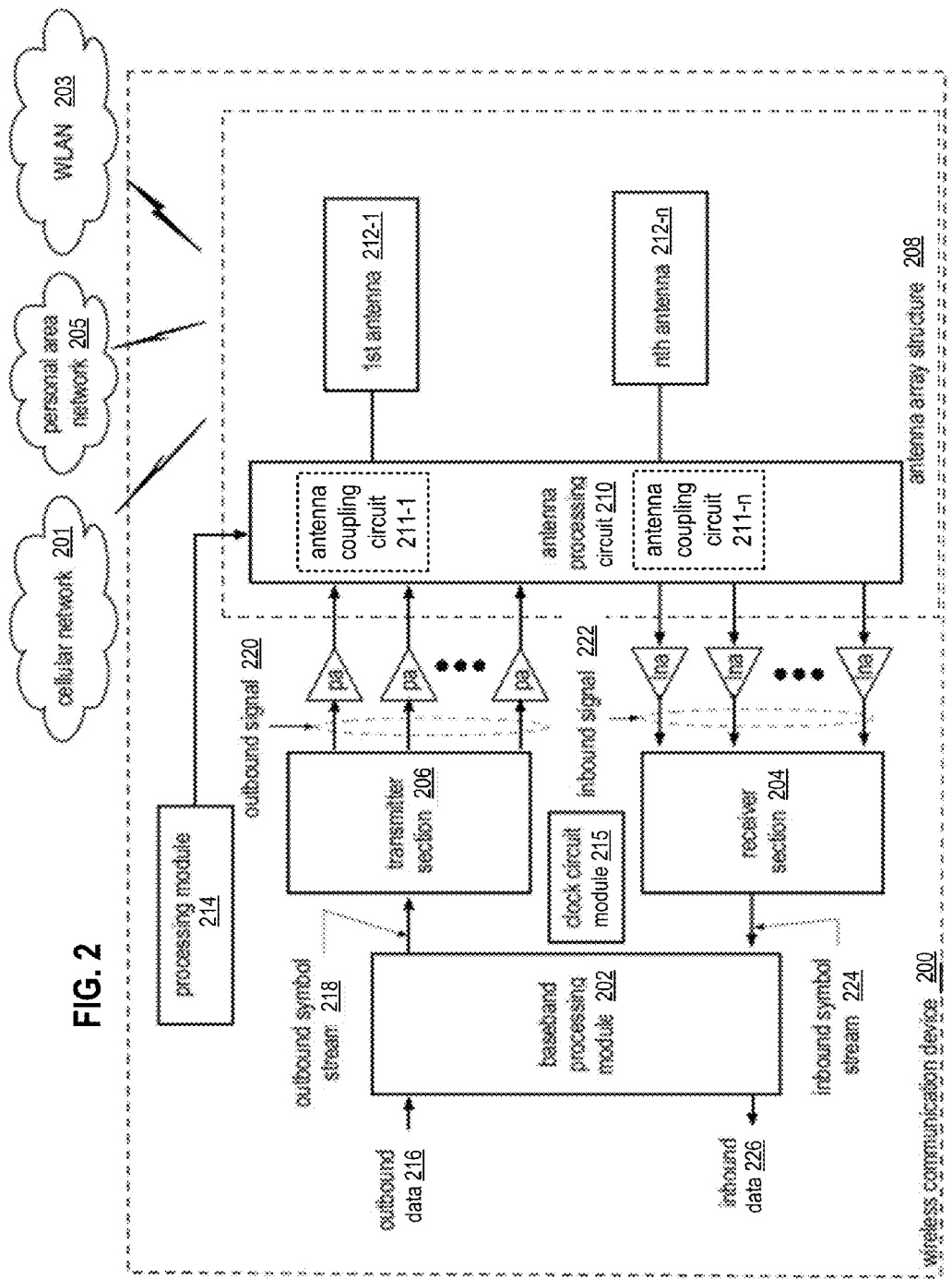
FIG. 2 is a schematic block diagram of an embodiment of a wireless communication device in accordance with the present disclosure.

FIG. 2 is a schematic block diagram of an example of a wireless communication device in accordance with the present disclosure. The wireless communication device 200 includes a processing module 214, and a baseband processing module 202, a clock circuit module 215 and an antenna structure 208 that includes a plurality of antennas (212-1 ... 212-n) and an antenna processing circuit 210 that includes a plurality of antenna coupling circuits (211-1 ... 211.n). A transceiver section includes a transmitter section 206 with a plurality of transmitters, a receiver section 204 with a plurality of receivers, a plurality of power amplifiers (PA) and a plurality of low noise amplifiers (LNA). The wireless communication device 200 can be any of the devices described in conjunction with communication environment 100 and further can include other devices that can be carried by a person, can be at least partially powered by a battery, that communicate using radio frequency (RF) and/or millimeter wave (MMW) signals, and/or that perform one or more software applications. For example, the wireless communication device 200 may be a cellular telephone, a laptop computer, a personal digital assistant, a video game console, a video game player, a personal entertainment unit, a tablet computer, a smart watch, etc. The wireless communication device 200 uses the RF and/or MMW signals to communicate via a cellular network, a personal area network (PAN), and/or a wireless local area network (WLAN) network in accordance with one or more cellular, PAN (e.g., Bluetooth), and/or WLAN protocols. In particular, the transceiver section communicates first signals via a first antenna 212-1 in accordance with a first wireless protocol in a frequency band and contemporaneously communicates second signals via one or more other antennas (212-n ... ) in accordance with a second wireless protocol in the frequency band.

In an example of transmitting outbound data 216 destined for either cellular network 201, personal area network 205 and/or WLAN 203, the baseband processing module 202 converts one or more streams of outbound data 216 (e.g., voice, text, video, graphics, video file, audio file, etc.) into outbound symbol streams 218 in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), IEEE 802.15.3 or 802.15.4 standards, WLAN and WPAN 60 GHz band specifications, or other wireless standard)—depending on the network destination for the outbound data. Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the baseband processing module 202 converts a stream of outbound data 216 into a single outbound symbol stream 218 for Single Input Single Output (SISO) communications and/or for Multiple Input Single Output (MISO) communications and converts the outbound data 216 into multiple outbound symbol streams 218 for Single Input Multiple Output (SIMO) and Multiple Input Multiple Output (MIMO) communications. Further note that the baseband processing module 202 converts multiple streams of outbound data 216 into multiple outbound symbol streams 218 when the transceiver section is contemporaneously communicating with multiple networks in accordance with differing wireless protocols.

The transmitter section 206 converts the outbound symbol streams 218 into one or more outbound signals 220. The power amplifiers amplify the one or more outbound signals 220 (e.g., signals in one or more frequency bands 800 MHz, 2800 MHz, 2900 MHz, 2000 MHz, 2.4 GHz, 5 GHz, 60 GHz, etc.). The antenna processing circuit 210 receives the one or more outbound signals 220 and couples them to the antennas in a variety of ways based on various operational modes. For instance, the antenna processing circuit 210 is able to couple for multiple input multiple output (MIMO) operation, diversity antenna operation, and/or both MIMO and diversity antenna operations in accordance with one or more selectable MISO, SISO, SIMO or MIMO modes of operation. In an embodiment, the antenna coupling circuits, 211-1 through 211-n include impedance matching circuitry such as a pi-network, L-network, a transmission line, a diplexer, duplexer, transmit/receive switch and/or other circuitry to couple the antennas 212-1 through 212-n to the receivers of the receiver section 204 and/or the transmitters of the transmitter section 206.

The antenna processing circuit 210 sends the one or more outbound signals 220 to the antennas 212-1 through 212-n for transmission via one or more channels of interest via antenna coupling circuitry 211-1 through 211-n. Further note that the antenna processing circuit 210 can couple a first outbound signal 220 to a selected one of the antennas 212-1 through 212-n and a second outbound signal 220 to another selected one of the antennas 212-1 through 212-n when the transceiver section is contemporaneously communicating with multiple networks in accordance with differing wireless protocols. In an embodiment, the cellular network 201, PAN 205 and WLAN 203 have one or more dedicated antennas from the group of antennas 212-1 through 212-n, however, in other embodiments, the particular antennas used for each network can be allocated dynamically.

In an example of receiving an inbound signal 222, the antennas 212-1 through 212-n receive the one or more inbound signals 222 and provides them to the antenna processing circuit 210. The antenna processing circuit 210 couples, via antenna coupling circuitry 211-1 through 211-n, the signals to the low noise amplifiers in a variety of ways based on various operational modes. The low noise amplifiers amplify the one or more inbound signals 222 and provide them to the receiver section 204. The receiver section 204 converts the one or more inbound signals 222 into one or more inbound symbol streams 224.

The baseband processing module 202 converts the inbound symbol stream(s) 224 into inbound data 226 (e.g., voice, text, audio, video, graphics, etc.) in accordance with one or more wireless communication standards. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the baseband processing module 202 converts a single inbound symbol stream 224 into the inbound data 226 for Single Input Single Output (SISO) communications and/or for Multiple Input Single Output (MISO) communications and converts multiple inbound symbol streams 224 into the inbound data 226 for Single Input Multiple Output (SIMO) and Multiple Input Multiple Output (MIMO) communications in accordance with one or more selectable MISO, SISO, SIMO or MIMO modes of operation. Further note that the baseband processing module 202 converts multiple inbound symbol streams 224 into streams of inbound data 226 when the transceiver section is contemporaneously communicating with multiple networks in accordance with differing wireless protocols.

The wireless communication device 200 may be implemented using one or more integrated circuits (IC) and one or more substrates (e.g., printed circuit boards), where an IC includes one or more IC dies. For example, the antenna processing circuit 210, the power amplifiers, and the low noise amplifiers may be implemented on the one or more IC dies and the antennas 212-1, through 212-n on an IC package substrate and/or one of the substrates. As another example, one or more of the baseband processing module 202, the receiver section 204, the transmitter section 206, and the processing module 214 may also be implemented on the one or more IC dies or other circuits.

In particular, the wireless communication device 200 includes an antenna structure that is described, in conjunction with several optional functions and features, in conjunction with FIGS. 3-9 that follow.

Figure 3:
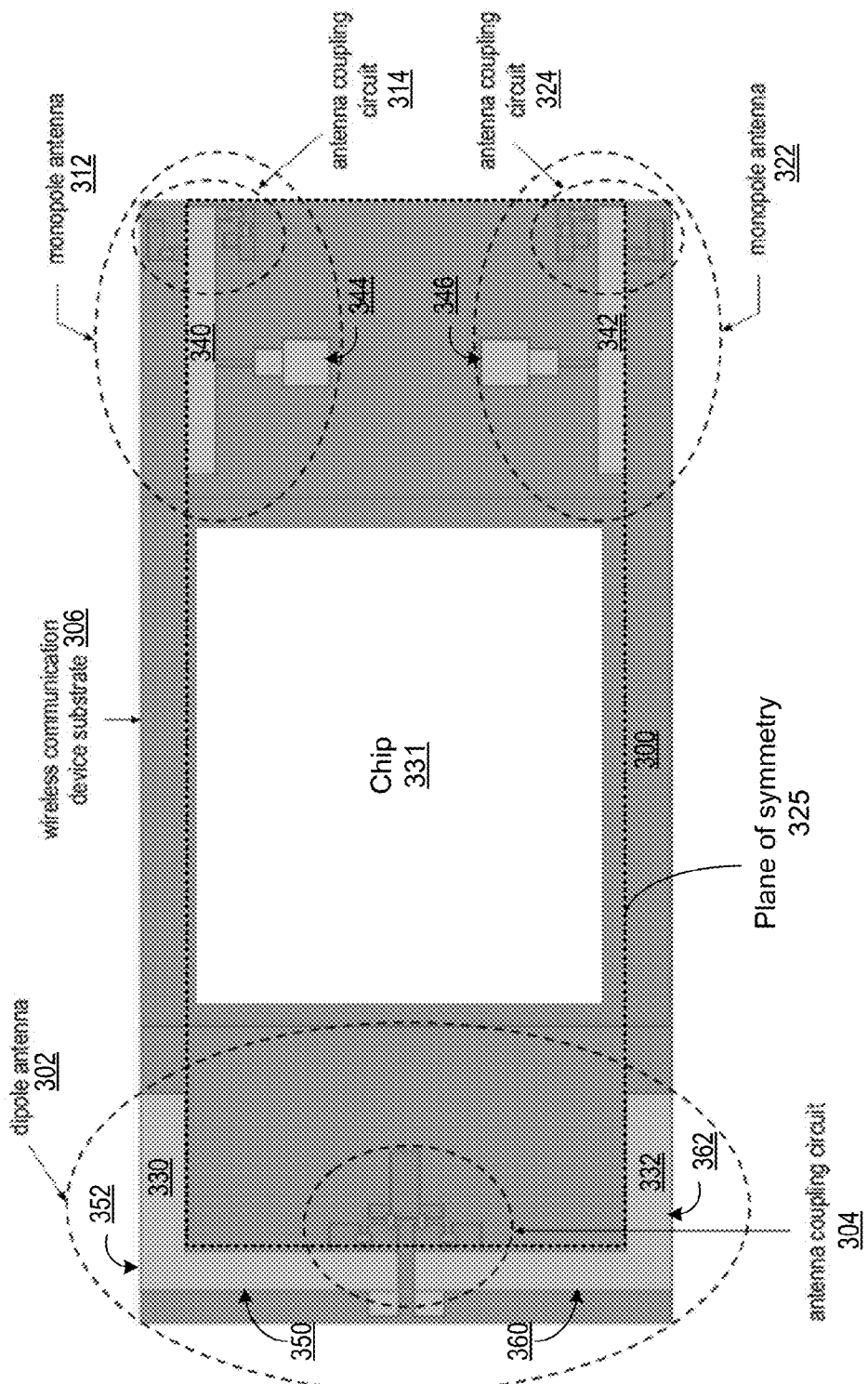
FIG. 3 is a top view of an embodiment of an antenna structure for a wireless communication device in accordance with the present disclosure.

FIG. 3 is a top view of an embodiment of an antenna structure for a wireless communication device in accordance with the present disclosure. A circuit 300 is presented that includes a chip 331 having circuitry such as a transceiver section described in conjunction with FIG. 2. The circuit 300 includes a three-dimensional antenna structure that includes dipole antenna 302 and monopole antennas 312 and 322 (such as antennas 212-1, . . . 212-2) that are coupled to the chip 331 via antenna coupling circuits 304, 314 and 324 (such as the antenna coupling circuits 211-1 . . . 211-n). The antenna coupling circuits 304, 314 and 324 can each include one or more of an impedance matching circuit, a transmission line, a transmit/receive isolation module, and a single-ended or differential port.

The three-dimensional antenna structure is configured to work in the presence of a nearby ground plane and to provide high isolation between the antennas for concurrent multi-mode operation (e.g., Bluetooth and WLAN, WLAN and cellular, cellular and Bluetooth, etc.). This three-dimensional antenna structure can substantially mitigate the degradation of two-dimensional antennas (e.g., PCB printed antennas) which results from the electric vector image on the ground plane cancelling, or at least partially cancelling the original electric vector component of the antenna.

In an example embodiment, a multi-mode wireless communication device, such as communication device 200 described in conjunction with FIG. 2, includes the circuit 300 implemented above a ground plane (below the circuit 300, but not shown). In particular, the circuit 300 includes a plurality of three-dimensional antennas that are spaced a given distance above the ground plane for a given operating frequency band (e.g., 5-10 mm for 2.4 to 5 GHz). For instance, a first antenna structure includes a three-dimensional dipole antenna 302 and a second antenna structure includes one or more three-dimensional monopole antennas (312 . . . 322).

As a specific example, a wireless communication device supports concurrent Bluetooth and WLAN communications. The wireless communication device includes circuit 300 that implements a Bluetooth/Wi-Fi board having a size of 85 mm×35 mm. The board has the chip 331 and other components area that is 55 mm×35 mm. The dipole antenna 302 with 2.5 GHz resonance is placed on one side of the board and two monopole antennas 312 and 322 with 2.5 GHz/5 GHz dual band resonance are placed on the other side.

The three-dimensional dipole antenna 302 includes arms 330 and 332 that are implemented via metal strips suspended above the ground plane. Each arm 330 or 332 can be considered to include two portions that are substantially perpendicular to one other. The arm 330 has a portion 350 and a portion 352 that is perpendicular to the portion 350. The arm 332 has a portion 360 that is coaxial with the portion 350 and a portion 362 that is parallel to the portion 352 and perpendicular to the portion 360.

The arms 330 and 332, in the presence of the ground plane, resonate as the desired operating frequency band, or bands. For instance, the arms 330 and 332 can have a 10 mm (or other length) metal strip that is 5-10 mm from the ground plane and substantially parallel to the ground plane. In free space (i.e., not in the presence of the ground plane), a 10 mm metal strip resonates at about 30 GHz, however, the presence of the nearby ground plane, the metal strip resonates at about 2.4 to 5 GHz.

Similarly, the monopole antennas 312 and 322 include monopole elements 340 and 342 and adjacent stub elements 344 and 346. The monopole elements 340 and 342 can each be implemented by a 10 mm (or other length) metal strip that is 5-10 mm from the ground plane and substantially parallel to the ground plane. In free space (i.e., not in the presence of the ground plane), a 10 mm metal strip resonates at about 30 GHz, however, the presence of the nearby ground plane and the stub elements 344 and 346 that modify the radiation pattern of the monopole antennas 312 and 322 away from the other monopole, the metal strip resonates with dual band resonance of approximately 2.4 and 5 GHz.

In the embodiment shown, the arms 330 and 332 are coplanar with the monopole elements 340 and 342 of the monopole antennas 312 and 322. A plane of symmetry 325 between the arms 330 and 332 of the dipole antenna 302 provides an electromagnetic "invisible zone". This invisible zone behaves like an electric wall or a short to tangential electric fields. One or more other antennas can be positioned in the plane of symmetry 325, between the arms 330 and 332 of the dipole antenna, to take advantage of this isolation. In the embodiment shown, the antenna structure includes a plurality of monopole antennas 312 and 322 that are positioned within the plane of symmetry 325 to provide a desired level of isolation between the dipole antenna 302 and the monopole antennas 312 and 322.

Note that while the three-dimensional antenna structure shown has been described above with reference to FIGS. 1 and/or 2 and, as such, may include more or less antenna structures than illustrated in the present figure. Further, the various elements of the circuit 300 are drawn to illustrate various features and may not be presented exactly to scale. In addition, the dimensions presented for various elements of the antenna structure can differ from the examples presented, and in particular, are dependent on the particular operating frequency band or bands.

Figure 4:
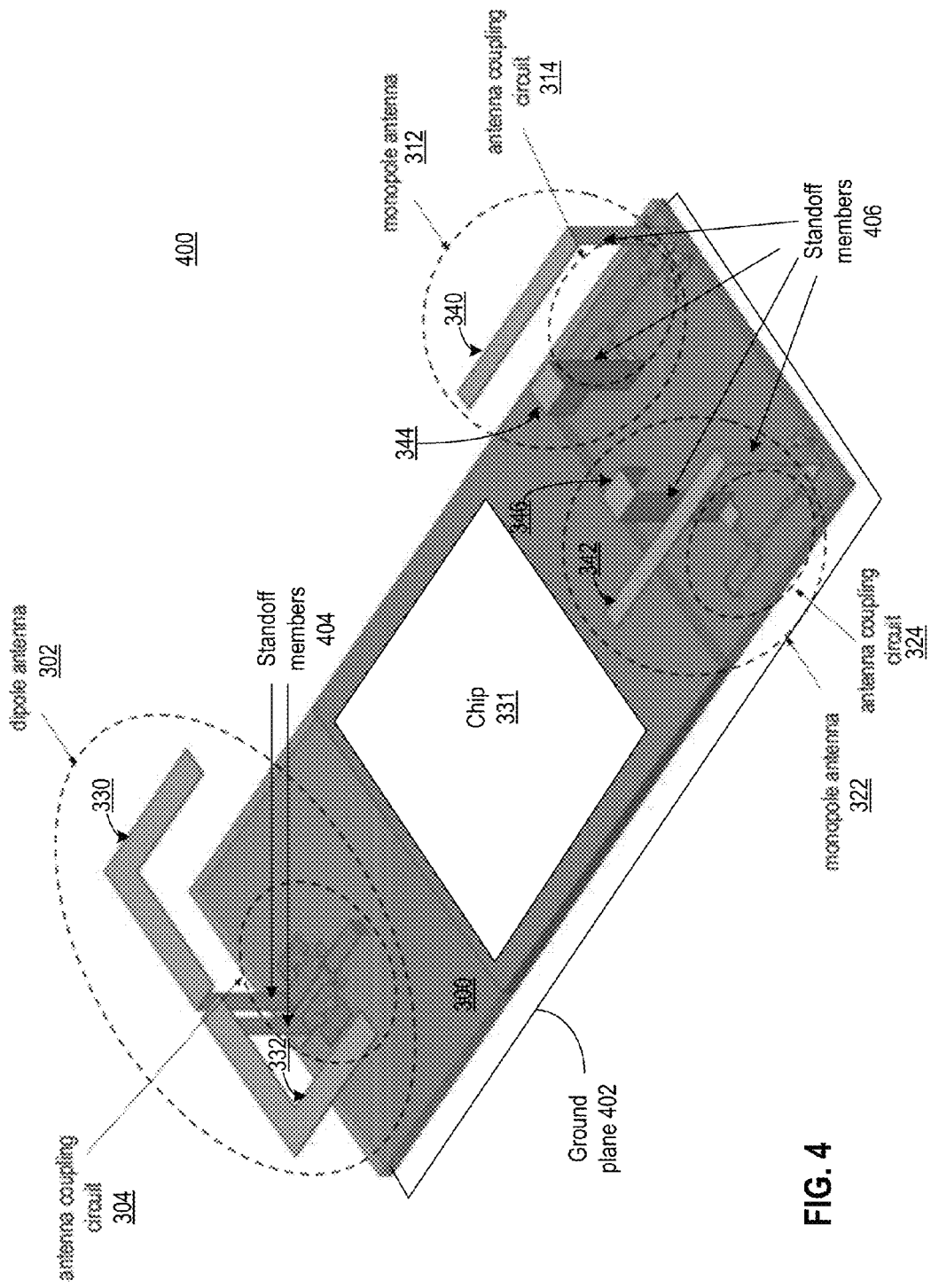
FIG. 4 is an isometric view of the embodiment of an antenna structure for a wireless communication device in accordance with the present disclosure.

FIG. 4 is an isometric view of the embodiment of an antenna structure for a wireless communication device in accordance with the present disclosure. The view 400 that is shown, includes the circuit 300 having a three-dimensional antenna structure that includes dipole antenna 302 and monopole antennas 312 and 322 (such as antennas 212-1, . . . 212-2) that are coupled to the chip 331 via antenna coupling circuits 304, 314 and 324 (such as the antennas coupling circuits (211-1 . . . 211-*n*).

As discussed in conjunction with FIG. 3, the three-dimensional antenna structure is configured to work in the presence of a nearby ground plane 402 and to provide high isolation between the antennas for concurrent multi-mode operation (e.g., Bluetooth and WLAN, WLAN and cellular, cellular and Bluetooth, etc.). As previously discussed, this three-dimensional antenna structure can substantially mitigate the degradation of two-dimensional antennas (e.g., PCB printed antennas) which results from the electric vector image on the ground plane cancelling, or at least partially cancelling the original electric vector component of the antenna.

As discussed in conjunction with FIG. 3, the circuit 300 includes a three-dimensional dipole antenna 302 that includes arms 330 and 332 and standoff members 404 so as to be spaced a given distance above the ground plane 402 for a given operating frequency band (e.g., 5-10 mm for 2.4 to 5 GHz). The three-dimensional monopole antennas 312 and 322 include monopole elements 340 and 342 and stubs 344 and 346 and standoff members 406 so as to be spaced a given distance above the ground plane 402 for a given operating frequency band (e.g., 5-10 mm for 2.4 to 5 GHz).

Figure 5:
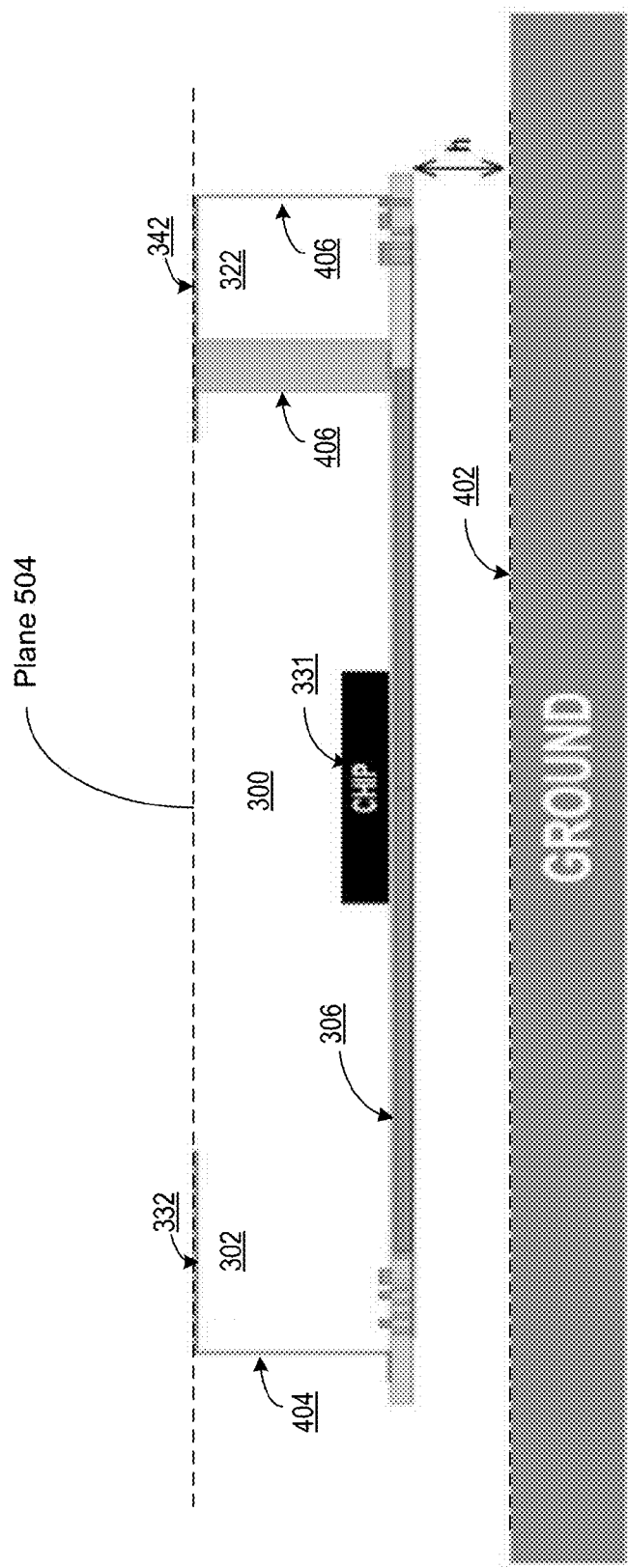
FIG. 5 is a side view of the embodiment of an antenna structure for a wireless communication device in accordance with the present disclosure.

FIG. 5 is a side view of the embodiment of an antenna structure for a wireless communication device in accordance with the present disclosure. This figure illustrates the relationship between the antenna elements of the dipole antenna 302 and the monopole antenna 322 and ground plane 402. It further illustrates the substrate 306 and other component areas of the board which supports chip 331. In other examples, the substrate 306 can support additional chips and/or other discrete components.

The plane 504 made by the antennas 302 and 322 is parallel to the ground plane 402 and spaced apart by a distance that is less than twice the length of the 332 arm and the monopole element 342, and optionally less than the length of the 332 arm and the monopole element 342. The sum of the height of the board above the ground plane h and the height of the antenna elements above the board (the height of standoff members 404 and 406) can be selected as a function of the desired operation frequencies of the wireless communication device in order to achieve the desired resonance frequencies of the antennas 302 and 322.

In the example discussed in conjunction with FIG. 3 with a given operating frequency band (e.g., for 2.4 to 5 GHz), the three-dimensional dipole antenna 302 includes 10 mm arms 330 and 332 and monopole antennas 312 and 322 include 10 mm monopole elements 340 and 342. The length of standoff members 404 and 406 are selected to that the plane 504 is spaced a given distance above the ground plane 402 (5-10 mm).

Figure 6:
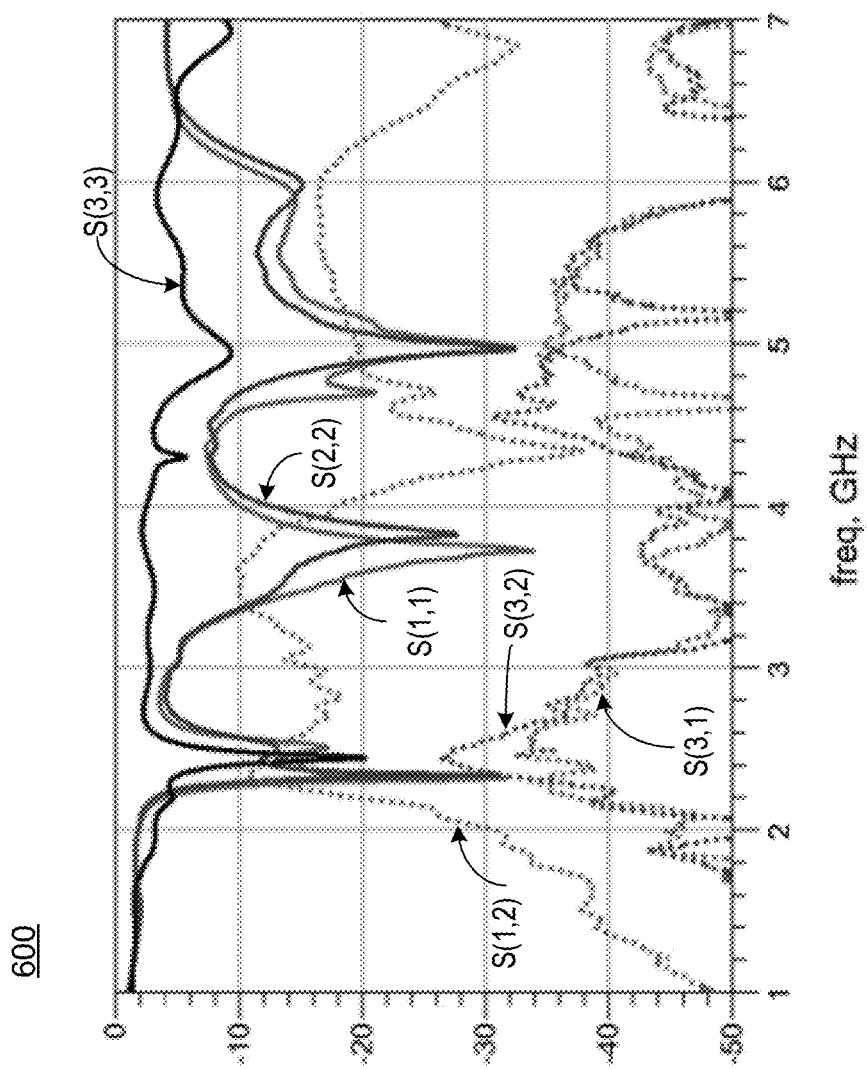
FIGS. 6-8 are diagrams of example performances of antenna structures for a wireless communication device in accordance with the present disclosure.
Figure 7:
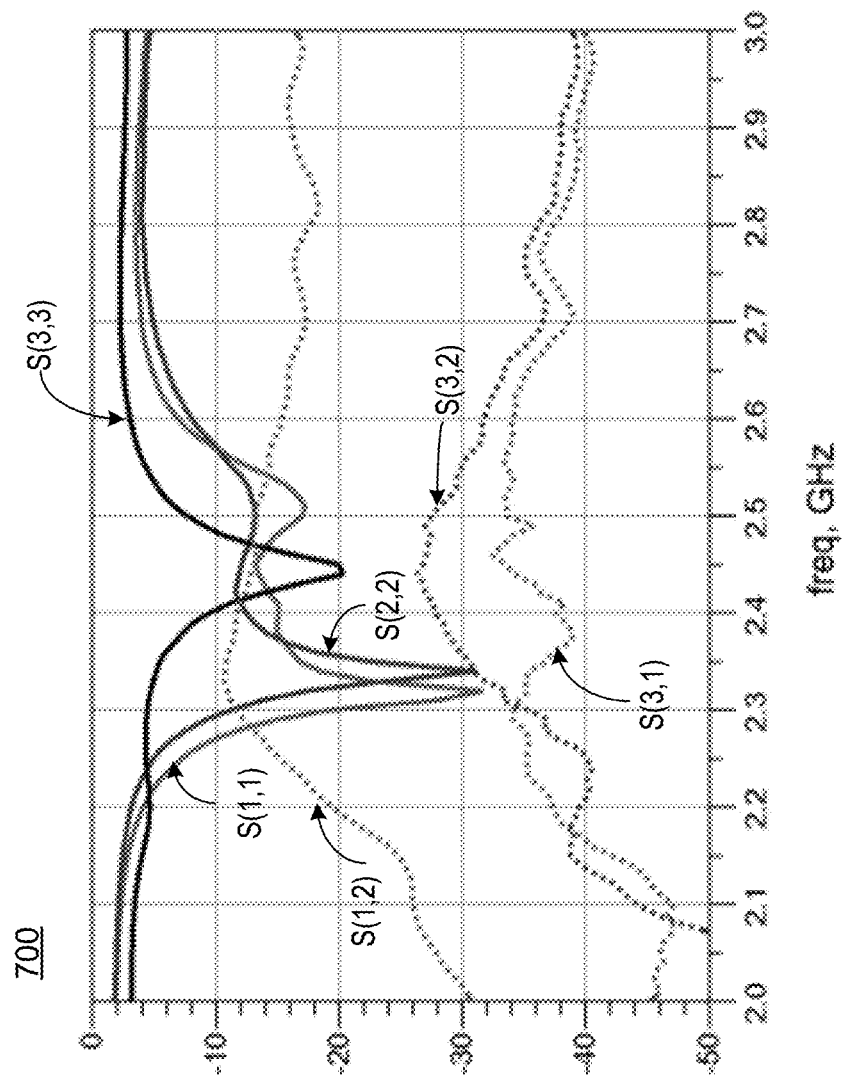
Figure 8:
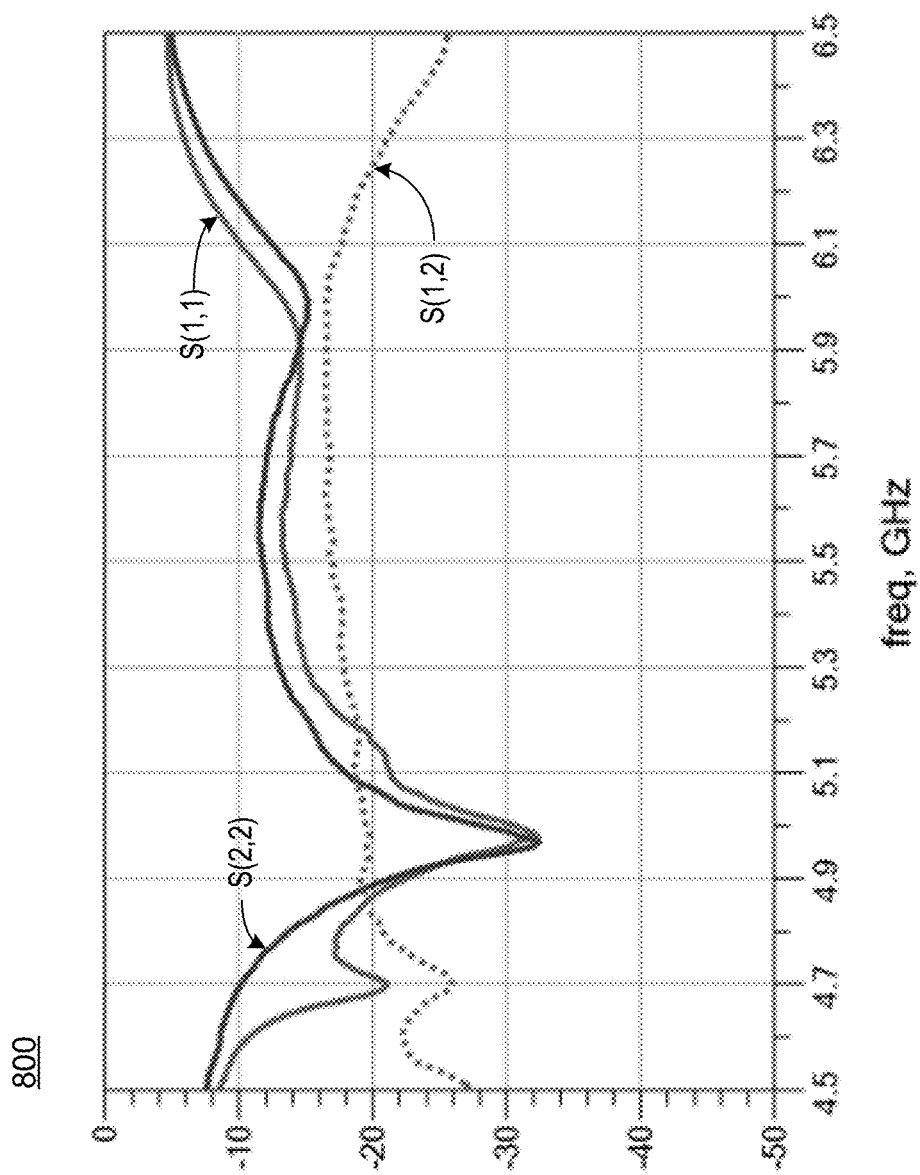

FIGS. 6-8 are diagrams of example performances of an antenna structure for a wireless communication device in accordance with the present disclosure. Consider the application where the monopole antennas 312 and 322 are used for WLAN communications in the 2.4 GHz and 5 GHz bands and the dipole antenna 302 is used for Bluetooth communications in the 2.4 GHz band. These figures illustrate examples of a measured return loss and isolation in terms of S parameter values where the port values are assigned as monopole 312 (port 1), monopole 322 (port 2) and dipole 302 (port 3).

In particular, FIG. 6 presents a graph 600 of S parameter values as a function of frequency for all three antenna ports over a broad range from 1-7 GHz. FIG. 6 presents S parameter values as a function of frequency for all three antenna ports over a broad range from 1-7 GHz. FIG. 7 presents a graph 700 of S parameter values as a function of frequency for all three antenna ports at low band frequencies in a range from 2-3 GHz. FIG. 8 presents a graph 800 of S parameter values as a function of frequency for the two WLAN ports at high band frequencies in a range from 4.5-6.5 GHz.

As shown by these figures, a 10 dB return WLAN has a broad bandwidth at 2300 MHz~2600 MHz (300 MHz) and 5 GHz-6 GHz (1 GHz). Bluetooth bandwidth is ~80 MHz. Isolation between ports is excellent, 35 dB 13 dB (2.4 GHz) and 17 dB (5 GHz) respectively. Bluetooth to WLAN isolation is in the range of 30~40 dB. At 2.4 GHz, WLAN to WLAN Isolation ~13 dB. At 5 GHz, WLAN to WLAN Isolation ~17 dB.

While the previous figures illustrated dipole and monopole antennas using metal strip antenna elements, the antenna elements may be of different shapes. For example, the shapes may be arced, a meandering line, a spiral, interwoven spirals, etc. Further, other types of three-dimensional antennas may be used. For example, helical, conical, parabolic, or other types of antennas may be used. Further, while the ground plane is shown as spaced below the circuit 300, a ground plane immediately below the circuit 300 can be also employed.

Figure 9:
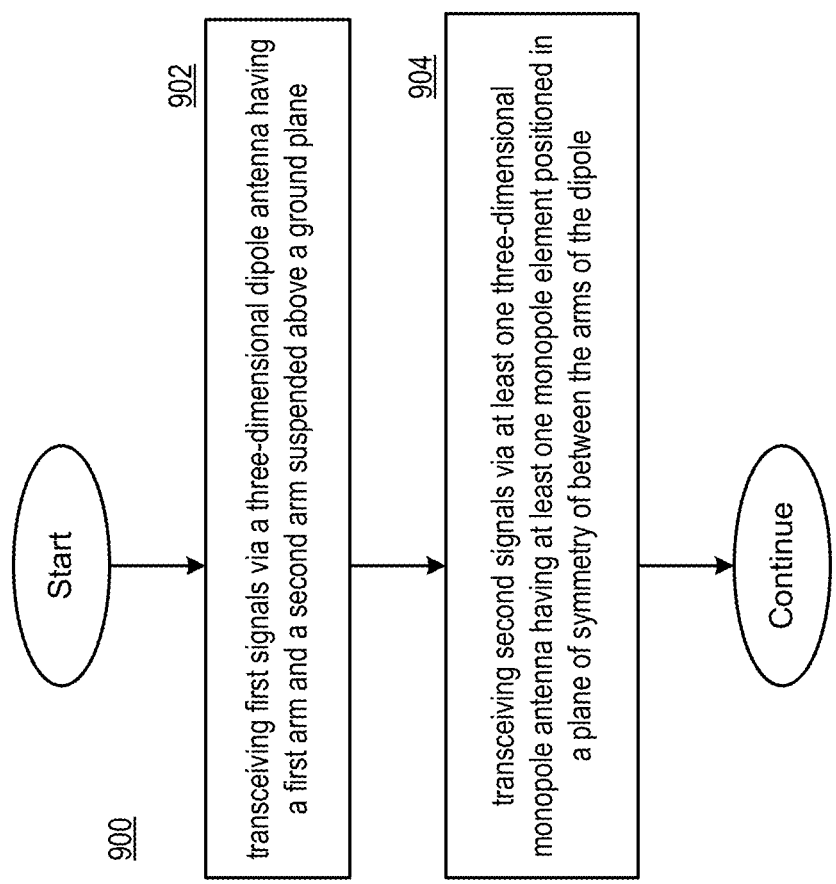
FIG. 9 is a flow diagram of an exemplary method in accordance with the present disclosure.

FIG. 9 is a flow diagram of an exemplary method in accordance with the present disclosure. In particular a method 900 is presented for use with one or more features and functions discussed in conjunction with FIGS. 1-8. Step 902 includes transceiving first signals via a three-dimensional dipole antenna having a first arm and a second arm suspended above a ground plane. Step 904 includes transceiving second signals via at least one three-dimensional monopole antenna having at least one monopole element positioned in a plane of symmetry between the arms of the dipole.

In an embodiment, the three-dimensional dipole antenna shorts tangential electric fields within the plane of symmetry. The first arm, the second arm and the at least one monopole element can be coplanar in accordance with a first plane. The first plane can be parallel to the ground plane and spaced apart by a distance that is less than twice the length of the first arm and possibly less than the length of the first arm. The monopole element can include a third portion that is coplanar with the first portion and the second portion.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An antenna structure comprising:
    a three-dimensional dipole antenna having a first arm and a second arm that are suspended above a ground plane, wherein the three-dimensional dipole antenna shorts tangential electric fields within a plane of symmetry between the first arm and the second arm; and
    at least one three-dimensional monopole antenna, having at least one monopole element positioned in the plane of symmetry between the first arm and the second arm.

2. The antenna structure of claim 1 wherein the first arm, the second arm and the at least one monopole element are coplanar in accordance with a first plane.

3. The antenna structure of claim 2 wherein the first plane is parallel to the ground plane and spaced apart by a distance that is less than twice a length of the first arm.

4. The antenna structure of claim 2 wherein the first plane is parallel to the ground plane and spaced apart by a distance that is less than a length of the first arm.

5. The antenna structure of claim 1 wherein the first arm has a first portion and the second arm has a second portion that is parallel to the first portion.

6. The antenna structure of claim 5 wherein the monopole element includes a third portion that is coplanar with the first portion and the second portion.

7. The antenna structure of claim 1 wherein the first arm has a first portion and a second portion that is perpendicular to the first portion and wherein the second arm has a third portion that is coaxial with the first portion and a fourth portion that is parallel to the second portion.

8. The antenna structure of claim 1 wherein the three-dimensional dipole antenna and the least one three-dimensional monopole antenna are tuned for operation in a same frequency band.

9. A method comprising:
    transceiving first signals via a three-dimensional dipole antenna having a first arm and a second arm suspended above a ground plane, wherein the three-dimensional dipole antenna shorts tangential electric fields within a plane of symmetry between the first arm and the second arm; and
    transceiving second signals via at least one three-dimensional monopole antenna having at least one monopole element positioned in the plane of symmetry between the first arm and the second arm.

10. The method of claim 9 wherein the first arm, the second arm and the at least one monopole element are coplanar in accordance with a first plane.

11. The method of claim 10 wherein the first plane is parallel to the ground plane and spaced apart by a distance that is less than twice a length of the first arm.

12. The method of claim 10 wherein the first plane is parallel to the ground plane and spaced apart by a distance that is less than a length of the first arm.

13. The method of claim 9 wherein the first arm and the second arm are coplanar.

14. A communication device comprising:
    a three-dimensional dipole antenna having a first arm and a second arm that are suspended above a ground plane, wherein the three-dimensional dipole antenna shorts tangential electric fields within a plane of symmetry between the first arm and the second arm;
    at least one three-dimensional monopole antenna, having at least one monopole element positioned in the plane of symmetry between the first arm and the second arm; and
    a transceiver section that communicates first signals via the three-dimensional dipole antenna in accordance with a first wireless protocol in a frequency band and that contemporaneously communicates second signals via the three-dimensional dipole antenna in accordance with a second wireless protocol in the frequency band.

15. The communication device of claim 14 wherein the first arm, the second arm and the at least one monopole element are coplanar in accordance with a first plane.

16. The communication device of claim 15 wherein the first plane is parallel to the ground plane and spaced apart by a distance that is less than a length of the first arm.

17. The communication device of claim 14 wherein the first wireless protocol is a wireless local area network protocol and the second wireless protocol is a personal area network protocol.

18. The communication device of claim 14 wherein the first arm has a first portion and a second portion that is perpendicular to the first portion and wherein the second arm has a third portion that is coaxial with the first portion and a fourth portion that is parallel to the second portion.

19. The communication device of claim 14 wherein the first arm has a first portion and the second arm has a second portion that is parallel to the first portion.

20. The communication device of claim 19 wherein the monopole element includes a third portion that is coplanar with the first portion and the second portion.

* * * * *